US012167204B2

(12) United States Patent
Dierks et al.

(10) Patent No.: US 12,167,204 B2
(45) **Date of Patent: *Dec. 10, 2024**

(54) METHODS FOR CONTROLLING A HEARING DEVICE BASED ON ENVIRONMENT PARAMETER, RELATED ACCESSORY DEVICES AND RELATED HEARING SYSTEMS

(71) Applicant: GN Hearing A/S, Ballerup (DK)

(72) Inventors: Søren Dierks, Ballerup (DK); Astrid Haastrup, Ballerup (DK); Denise De Leeuw Kristensen, Ballerup (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,492

(22) Filed: May 18, 2023

(65) Prior Publication Data

US 2023/0292066 A1 Sep. 14, 2023

Related U.S. Application Data

(63) Continuation of application No. 16/543,459, filed on Aug. 16, 2019, now Pat. No. 11,750,987.

(30) Foreign Application Priority Data

Sep. 7, 2018 (EP) .................................... 18193189

(51) Int. Cl.
*H04R 25/00* (2006.01)

(52) U.S. Cl.
CPC ......... *H04R 25/558* (2013.01); *H04R 25/505* (2013.01)

(58) Field of Classification Search
None
See application file for complete search history.

(56) References Cited

U.S. PATENT DOCUMENTS 8,379,871 B2 2/2013 Michael et al.
11,750,987 B2 * 9/2023 Dierks ................ H04R 25/558 381/315
2011/0280409 A1 11/2011 Michael et al.
(Continued)

FOREIGN PATENT DOCUMENTS

CN 106126183 11/2016
CN 106572411 4/2017
(Continued)

OTHER PUBLICATIONS

Final Office Action for U.S. Appl. No. 16/543,459 dated Jan. 5, 2023.
(Continued)

*Primary Examiner* — Walter F Briney, III
(74) *Attorney, Agent, or Firm* — Vista IP Law Group, LLP

(57) ABSTRACT

Disclosed is a method, performed in an accessory device, for controlling a hearing device, the accessory device comprising an interface, a memory, a display, and a processor. The method comprises determining an environment parameter. The method comprises determining a processing context parameter based on the environment parameter. The method may comprise displaying on the display a first user interface object representative of the processing context parameter.

22 Claims, 4 Drawing Sheets

(56) References Cited

U.S. PATENT DOCUMENTS

| | | | |
|---|---|---|---|
| 2014/0211972 | A1 | 7/2014 | Kim et al. |
| 2015/0049892 | A1 | 2/2015 | Petersen et al. |
| 2015/0271607 | A1 | 9/2015 | Sabin |
| 2016/0309267 | A1 | 10/2016 | Fitz et al. |
| 2017/0230788 | A1 | 8/2017 | Simonides et al. |

FOREIGN PATENT DOCUMENTS

| | | |
|---|---|---|
| CN | 107580288 | 1/2018 |
| WO | WO 2012/010218 | 1/2012 |

OTHER PUBLICATIONS

Final Office Action for U.S. Appl. No. 16/543,459 dated Jan. 27, 2022.

Final Office Action for U.S. Appl. No. 16/543,459 dated Jan. 4, 2021.

Non-Final Office Action for U.S. Appl. No. 16/543,459 dated Jul. 21, 2022.

Non-Final Office Action for U.S. Appl. No. 16/543,459 dated Jul. 2, 2021.

Non-Final Office Action for U.S. Appl. No. 16/543,459 dated Jun. 23, 2020.

Amendment Response to NFOA for U.S. Appl. No. 16/543,459 dated Nov. 11, 2022.

Amendment Response to NFOA for U.S. Appl. No. 16/543,459 dated Nov. 10, 2021.

Amendment Response to NFOA for U.S. Appl. No. 16/543,459 dated Oct. 23, 2020.

Amendment Response to FOA for U.S. Appl. No. 16/543,459 dated Mar. 28, 2022.

Amendment Response to FOA for U.S. Appl. No. 16/543,459 dated Apr. 5, 2023.

Amendment Response to FOA for U.S. Appl. No. 16/543,459 dated May 26, 2021.

Notice of Allowance for U.S. Appl. No. 16/543,459 dated Apr. 27, 2023.

Foreign OA for CN Patent Appln. No. 201910836086.4 dated Jun. 6, 2022.

Foreign OA for CN Patent Appln. No. 201910836086.4 dated Jun. 16, 2023.

* cited by examiner

METHODS FOR CONTROLLING A HEARING DEVICE BASED ON ENVIRONMENT PARAMETER, RELATED ACCESSORY DEVICES AND RELATED HEARING SYSTEMS

RELATED APPLICATION DATA

This application is a continuation of U.S. patent application Ser. No. 16/543,459 filed on Aug. 16, 2019, pending, which claims priority to, and the benefit of, European Patent Application No. 18193189.0 filed on Sep. 7, 2018. The entire disclosures of the above applications are expressly incorporated by reference herein.

FIELD

The present disclosure pertains to the field of hearing device control. More specifically, the present disclosure relates to methods for controlling a hearing device and related accessory devices.

BACKGROUND

The acoustic conditions surrounding a hearing device are often affected by various sound sources, which may vary in time and space. Examples of sound sources include noise sources which are for example present over a longer period of time, specific to a given location, more frequent during certain times of the day. Examples of sound sources include speech sources for one or more individuals, sound sources from one or more devices.

SUMMARY

Accordingly, there is a need for methods, performed by an accessory device, for controlling a hearing device and related accessory devices, which are capable of supporting the adaptation of the hearing device processing to the conditions present in the environment including taking into account which sound source is desirable and which sound source is not desirable.

Disclosed is a method, performed in an accessory device, for controlling a hearing device, the accessory device comprising an interface, a memory, a display, and a processor. The method comprises determining an environment parameter. The method comprises determining a processing context parameter based on the environment parameter. The method may comprise displaying on the display a first user interface object representative of the processing context parameter.

The present disclosure enables an effective and simple control of environment-based hearing device processing by the user via the accessory device.

The present disclosure relates to an accessory device comprising a memory, an interface, a processor, and a display wherein the accessory device is configured to connect to a hearing device. The accessory device may be configured to perform any of the methods disclosed herein.

The present disclosure relates to a hearing system comprising an accessory device disclosed herein and a hearing device.

The present disclosure provides methods, accessory devices, and hearing systems that enable an optimization of the hearing processing by exploiting environment information that may have been collected by one or more users.

It may be advantageous for any hearing device user to be able to control the hearing device using his/her accessory device according to the present disclosure using a user interface as disclosed herein. The present disclosure may enable a hearing device controlled by the disclosed accessory device to leapfrog to noise cancellation schemes which have been previously applied to pre-recorded noises for a given environment, e.g. at a given location and/or time. The present disclosure may particularly be advantageous for prioritizing speech signals from a targeted person, and/or in certain locations or location types, voices of certain selected persons, e.g. by amplification beyond other sounds in the acoustic environment, and/or in certain locations or location types, to indicate events, e.g. related to critical information (e.g. of dangers, e.g. fire alarm, gas alarm) or related to an action (e.g. door bell ringing, mail arrived)—which can be specific to the location or location type.

BRIEF DESCRIPTION OF THE DRAWINGS

The above and other features and advantages of the present disclosures will become readily apparent to those skilled in the art by the following detailed description of exemplary embodiments thereof with reference to the attached drawings, in which.

DETAILED DESCRIPTION

Figure 1:
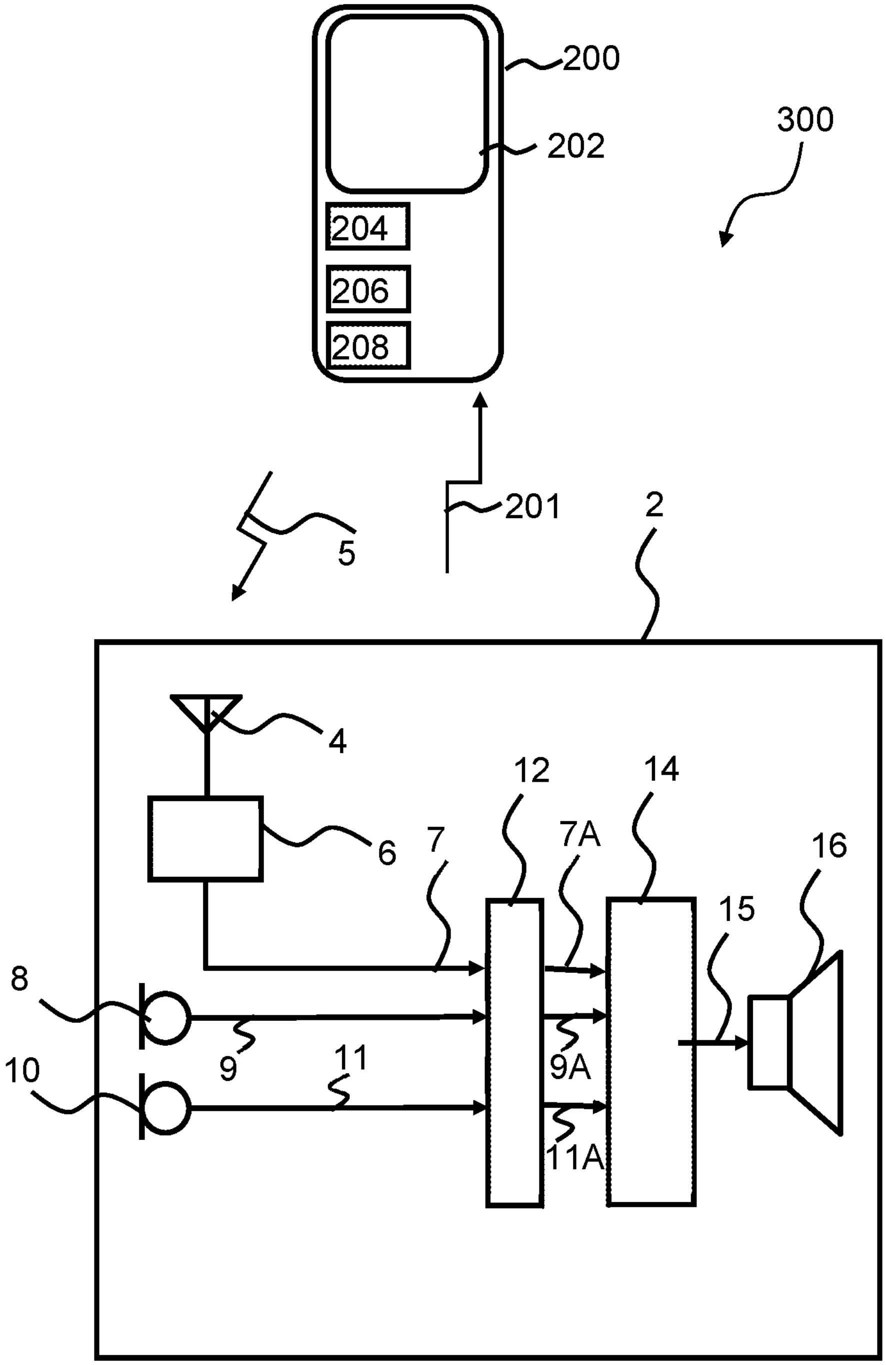
FIG. 1 schematically illustrates a hearing system comprising an exemplary hearing device according to the disclosure and an accessory device according to the disclosure

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to a method, performed in an accessory device, for controlling a hearing device, the accessory device comprising an interface, a memory, a display, and a processor.

The term "accessory device" as used herein refers to a device that is able to communicate with the hearing device. The accessory device may refer to a computing device under the control of a user of the hearing device. The accessory device may comprise a handheld device, a relay, a tablet, a personal computer, a mobile phone, an application running on a personal computer or tablet, or mobile phone and/or USB dongle plugged into a personal computer. The accessory device may be configured to communicate with the hearing device. The accessory device may be configured to control operation of the hearing device, e.g. by transmitting information to the hearing device.

The method comprises determining an environment parameter. For example, the method may comprise determining, using the processor, an environment parameter. The method comprises determining a processing context parameter based on the environment parameter. For example, the method may comprise determining, using the processor, a processing context parameter based on the environment parameter. The method may comprise displaying on the display a first user interface object representative of the processing context parameter. The display may comprise a touch-sensitive display.

The environment parameter may be indicative of location. The method may comprise storing, on the memory, the determined processing context parameter, such as storing temporarily or permanently.

In one or more exemplary methods, displaying a user interface object, e.g. a first user interface object and/or a second user interface object comprises displaying a text prompt, an icon and/or an image. The first user interface object may be representative of a hearing processing scheme identifier.

In one or more exemplary methods, the method comprises detecting a user input selecting the first user interface object representative of the processing context parameter. In one or more exemplary methods, the method comprises in response to detecting the user input, transmitting via the interface to the hearing device the processing context parameter.

A processing context parameter refers herein to a parameter which indicative of a context of an environment where the hearing device is operating, and which indicates a processing scheme to be (preferably) used in the environment so as to e.g. reduce noise, to compress, to prioritize input signals to improve the processing of the hearing device, e.g. for compensation of hearing loss.

In one or more exemplary methods, the environment parameter comprises a location parameter and/or an environment type parameter. The location parameter may be indicative of a location of the hearing device. The environment type parameter may be indicative of a type of environment or a type of location. The environment type or location type may be indicative of one or more of: an indoor location type, an outdoor location type, a train station type, an airport type, a concert hall type, a school type, a classroom type, a vehicular type (e.g. indicative of whether the hearing device is located in a vehicle, such as a train, car, bicycle in motion).

Determining the environment parameter may comprise receiving a wireless input signal, and determining the environment parameter based on the wireless input signal. For example, receiving a wireless input signal from a wireless local area network may be indicative of a location parameter (e.g. of the location being home, office, school, restaurant), or of an environment type parameter (e.g. of indoor location type, airport type, a concert hall type, a school type, a classroom type). For example, receiving a wireless localization input signal from a wireless navigation network (e.g. GPS) may be indicative of a location parameter (e.g. of the location being home, office, school, restaurant, e.g. of the location information (e.g. geographic coordinates)), or of an environment type parameter (e.g. of indoor location type, airport type, a concert hall type, a school type, a classroom type, a vehicular type). For example, receiving a wireless input signal from a short-range wireless system (e.g. Bluetooth) may be indicative of a location parameter (e.g. of the location being home, office, school), or of an environment type parameter (e.g. of indoor location type, a vehicular type (e.g. when the vehicle transmits short-range wireless input signals)).

In one or more exemplary methods, the accessory device is configured to receive a wireless input signal (e.g. a wireless input signal from a wireless local area network indicative of a location parameter (e.g. of the location being home, office, school, restaurant), or of an environment type parameter (e.g. of indoor location type, airport type, a concert hall type, a school type, a classroom type); a wireless localization input signal from a wireless navigation network (e.g. GPS) indicative of a location parameter (e.g. of the location being home, office, school, restaurant, e.g. of the location information (e.g. geographic coordinates)), or of an environment type parameter (e.g. of indoor location type, airport type, a concert hall type, a school type, a classroom type, a vehicular type); a wireless input signal from a short-range wireless system (e.g. Bluetooth) indicative of a location parameter (e.g. of the location being home, office, school), or of an environment type parameter (e.g. of indoor location type, a vehicular type (e.g. when the vehicle transmits short-range wireless input signals))), to determine the environment parameter based on the wireless input signal, and to provide (e.g. to transmit) the determined environment parameter to the hearing device.

In one or more exemplary methods, determining the processing context parameter based on the environment parameter comprises determining whether the environment parameter satisfies one or more first criteria. In one or more exemplary methods, determining a processing context parameter based on the environment parameter comprises in accordance with the environment parameter satisfying the one or more first criteria, determining the processing context parameter corresponding to the environment parameter. In one or more exemplary methods, the one or more first criteria comprise a location criterion, and determining whether the environment parameter satisfies the one or more first criteria comprises determining whether the environment parameter satisfies the location criterion. In one or more exemplary methods, determining whether the environment parameter satisfies the location criterion comprises determining whether the environment parameter is indicative of a location that is comprised in a geographic area present in a hearing processing database. The hearing processing database may refer to a database comprising one or more of: a set of hearing processing scheme identifiers, one or more sets of sound signals (e.g. output signals for provision by a receiver of the hearing device), corresponding timestamps. The hearing processing database can be envisaged to include a hearing processing library, such as a hearing processing collection, such as a hearing processing map. The hearing processing database may be stored on one or more of: a memory unit of the hearing device memory, an accessory device coupled to hearing device, or a remote storage mean from which the processing context parameter is retrievable upon request from the hearing device and/or the accessory device.

Determining whether the environment parameter is indicative of a location that is comprised in a geographic area present in a hearing processing database may comprise transmitting a request comprising the environment parameter to a remotely located hearing processing database and receiving a response comprising an indication on whether the environment parameter is indicative of a location that is comprised in a geographic area present in the hearing processing database, and optionally a processing context parameter when the environment parameter is indicative of a location that is comprised in a geographic area present in the hearing processing database.

The one or more first criteria may comprise a time criterion. The time criterion may comprise a time period. Determining whether the environment parameter satisfies the one or more first criteria may comprise determining whether the environment parameter satisfies the time criterion by determining whether the environment parameter is indicative of a location that has been created and/or updated within the time period of the time criterion. In accordance with the determination that the environment parameter is indicative of a location that has been created and/or updated beyond the time period of the time criterion, it is determined that the environment parameter does not satisfies the time criterion, and thereby does not satisfy the one or more first criteria.

The method may comprise obtaining one or more input signals, e.g. via one or more microphones of the accessory device and/or via the interface of the accessory device (e.g. via a wireless interface of the accessory device) from the hearing device or an external device. An input signal may comprise microphone input signal and/or a wireless input signal (e.g. a wireless streaming signal). Obtaining one or more input signals may comprise obtaining one or more input signals from the acoustic environment (e.g. via the one or more microphones) or from a hearing device configured to communicate with the accessory device via the interface.

In one or more exemplary methods, the method comprises, in accordance with the environment parameter not satisfying the first criterion, recording at least a part of the one or more input signals. In one or more exemplary methods, the method comprises, in accordance with the environment parameter not satisfying the first criterion, storing, in the memory, at least a part of the one or more input signals and/or one or more parameters characterizing at least a part of the one or more input signals.

In one or more exemplary methods, the processing context parameter comprises a noise cancellation scheme identifier and/or a prioritization scheme identifier, and/or one or more output signal indicators indicative of one or more output signals to be transmitted to the hearing device. In one or more exemplary methods, the one or more output signals comprise an alert signal, an alarm signal and/or one or more streamed signals. The processing context parameter may reflect user preferences in terms of the desirability of sound sources with respect to the environment parameter. The processing context parameter may comprise a noise cancellation scheme identifier, and/or a prioritization scheme identifier, and/or one or more output signal indicators indicative of one or more output signals to be output by the hearing device. A noise cancellation scheme identifier may refer to an identifier uniquely identifying a noise cancellation scheme. A prioritization scheme identifier may refer to an identifier uniquely identifying a prioritization scheme. The one or more output indicators are indicative of one or more output signals (e.g. an alert sound, an alarm sound, a streamed signal) to be output by the hearing device, such as by the receiver.

In one or more exemplary methods, the method comprises determining a scene tag based on the environment parameter. A scene tag may be indicative of an acoustic environment, e.g.: at work, at home, at school, indoor and/or outdoor. In one or more exemplary methods, the method comprises associating the environment parameter with the scene tag. In one or more exemplary methods, the method comprises displaying on the display a second user interface object representative of the scene tag.

In one or more exemplary methods, determining a scene tag representative of the environment parameter comprises determining the scene tag based on the processing context parameter (e.g. a parameter indicative of a hearing processing context to be used by a hearing device coupled with the accessory device, such as indicative of the hearing processing scheme to be applied at the hearing device).

In one or more exemplary methods, the method comprises detecting a user input selecting the second user interface object representative of the scene tag; and in response to detecting the user input, retrieving the processing context parameter corresponding to the scene tag, and transmitting via the interface to the hearing device the processing context parameter.

In one or more exemplary methods, the method comprises associating, e.g. in a lookup table e.g. in the memory, one or more processing context parameters and one or more environment parameters with a scene tag. For example, a scene tag “school” may be associated with an environment parameter indicative of a school environment and a processing context parameter comprising a prioritization scheme identifier for prioritization of the voice of a teacher. For example, the scene tag “outdoor-train station” may be associated with an environment parameter indicative of an outdoor train station environment and a processing context parameter comprising a noise cancellation scheme identifier for outdoor and a decibel level, and/or a prioritization scheme identifier for prioritization of alerts from a station master.

In one or more exemplary methods, the method comprises obtaining a plurality of input signals from the hearing device. The plurality of input signals from the hearing device may comprise a plurality of wireless input signals from the hearing device, e.g. based on one or more microphones input signals captured by the hearing device configured to communicate with the accessory device.

In one or more exemplary methods, determining a processing context parameter based on the environment parameter comprises determining a hearing processing scheme based on the environment parameter and on at least a part of the plurality of input signals. Determining the hearing processing scheme based on the environment parameter and on at least a part of the plurality of input signals may be performed based on the processing context parameter. In one or more exemplary methods, determining a processing context parameter based on the environment parameter comprises transmitting the processing context parameter to the hearing device.

In one or more exemplary methods, the method comprises selecting the hearing processing scheme based on the processing context parameter and applying the hearing processing scheme to at least a part of or the plurality of input signals and transmitting via the interface the processed input signals to the hearing device.

In one or more exemplary methods, the method comprises determining a more favourable scene tag based on the environment parameter and/or on at least a part of the plurality of input signals. The method may comprise displaying on the display a third user interface object representative of the more favourable scene tag. For example, a more favourable scene tag based on the environment parameter refers to a scene tag that is determined by the accessory device as appropriate for improving or performing, at the hearing device, hearing processing based on the environment parameter and/or on at least a part of the plurality of input signals. The accessory device may be configured to access a collective hearing processing database configured to store the environment parameter with a corresponding processing context parameter for optimal processing at the hearing device. The accessory device may be configured to store, in the memory, the determined environment parameter with a corresponding determined processing context parameter and a more favourable scene tag for optimal processing at the hearing device.

In one or more exemplary methods, the method comprises detecting a user input selecting the third user interface object representative of the more favourable scene tag. In one or more exemplary methods, the method comprises in response to detecting the user input, transmitting via the interface to the hearing device an updated processing context parameter corresponding to the more favourable scene tag. For example, the accessory device may perform scene tag selection based on default user preferences and the method comprises determining a more favourable scene tag, displaying on the display a third user interface object representative of the more favourable scene tag, detecting a user input selecting the third user interface object representative of the more favourable scene tag, and in response to detecting the user input, transmitting via the interface to the hearing device an updated processing context parameter corresponding to the more favourable scene tag.

The present disclosure provides an improved control of the hearing device by the accessory device, which results in an improve hearing processing at the hearing device. Because the present disclosure enables an adjustment of the hearing processing by leveraging on the capabilities of the accessory device to select and indicate an improved processing scheme for the hearing device.

In one or more exemplary methods, the method comprises detecting a user input selecting the third user interface object representative of the more favourable scene tag. In one or more exemplary methods, the method comprises in response to detecting the user input, selecting the hearing processing scheme based on an updated processing context parameter corresponding to the more favourable scene tag, and applying the hearing processing scheme to the plurality of input signals and transmitting via the interface the processed input signals to the hearing device. This allows to feed the hearing device directly with processed input signals, thereby results in an improve battery life at the hearing device.

An input signal prioritization scheme may be configured to identify a voice based on the one or more input signals obtained by the hearing device by applying a blind source separation scheme.

In an example where the disclosed technique is applied and where N sound sources have been mixed into M microphones of the accessory device, it is assumed that the hearing processing (e.g. mixing processing) is linear and coefficient of the linear hearing processing is unknown (also referred to as the 'blind' part).

The input signals expressed as vector x obtained via the one or more microphones of the accessory device may be expressed e.g.:

$$x=A*son \quad (1)$$

where s denotes the sound source vector, n denotes noise observations. A, s, and n represent unknown variables.

Applying a blind source separation scheme comprises in this example applying the linear un-mixing scheme to the input signals received from the one or more sound sources, the following sound source vector estimate s^ may be obtained by e.g.:

$$s\hat{}=W*x=s+W*n \quad (2)$$

where W denotes an unmixing matrix.

Applying the linear un-mixing scheme may comprise estimating an un-mixing matrix W, e.g. by applying assumptions on the unknown variable s, e.g. one or more of the following assumptions:

The sound sources (or the random variables representative of the input signals obtained from the sound sources) are assumed to be uncorrelated; and/or The sound sources (or the random variables representative of the input signals obtained from the sound sources) are assumed to be statistically independent, whereby an independent component analysis may be applied; and/or The sound sources (or the random variables representative of the input signals obtained from the sound sources) are assumed to be non-stationary.

The sound sources (or the random variables representative of the input signals obtained from the sound sources) may also be assumed to be independent and identically distributed.

When the sound sources (or the random variables representative of the input signals obtained from the sound sources) are assumed to be uncorrelated and non-stationary, estimating an un-mixing matrix W may be performed by applying a convolutive blind source separation scheme, such as the convolutive blind source separation of non-stationary sources published by Para and Spence.

The input signal may comprise speech component and a noise component. The estimating of an un-mixing matrix W may be based on assumptions regarding the speech properties (e.g. speech signal distribution), and/or on assumptions regarding the noise (e.g. noise distribution).

The noise distribution may be assumed to be independent and identically distributed. The noise distribution may be assumed to be based on noise dependent dictionaries obtained by non-negative matrix factorization.

The speech distribution may be assumed to be independent and identically distributed. The speech distribution may be assumed to be based on noise dependent dictionaries obtained by non-negative matrix factorization.

A hearing processing scheme may comprise a noise cancellation scheme selected based on the processing context parameter, and/or an input signal prioritization scheme selected based on the processing context parameter.

A hearing processing scheme may comprise a noise cancellation scheme tailored or customized based on the environment parameter (so as to adapt the hearing processing to the environment of the hearing device), and/or an input signal prioritization scheme selected based on the processing context parameter tailored or customized based on the environment parameter (so as to adapt the hearing processing to the environment of the hearing device).

Obtaining the environment parameter may comprise obtaining an input signal and determining the environment parameter based on the input signal. For example, the input signal may comprise a wireless communication signal indicative of an environment, e.g. a WLAN signal indicative of an environment (e.g. office, restaurant, train station, school, hotel, hotel lobby); and/or a sound signal (e.g. indicative of outdoor or indoor environment).

The present disclosure relates to an accessory device comprising a memory, an interface, a processor, and a display wherein the accessory device is configured to connect to a hearing device. The accessory device may be configured to perform any of the methods disclosed herein. The accessory device may comprise a set of microphones. The set of microphones may comprise one or more microphones.

The present disclosure relates to a hearing system comprising an accessory device disclosed herein and a hearing device. The hearing device may be a hearable (e.g. a headset, earphones) or a hearing aid, wherein the processor is configured to compensate for a hearing loss of a user. The present disclosure applies to hearables and hearing aids.

In one or more preferred embodiments, the hearing device is a hearing aid configured to compensate for hearing loss of a user. The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

The hearing device comprises a memory, an interface, a processor that may be configured to compensate for hearing loss, a receiver, and one or more microphones. The hearing device is configured to perform any of the methods disclosed herein. The processor is configured to perform any of the methods disclosed herein.

The hearing device comprises an antenna for converting one or more wireless input signals, e.g. a first wireless input signal and/or a second wireless input signal, to an antenna output signal. The wireless input signal(s) origin from external source(s), such as spouse microphone device(s), wireless TV audio transmitter, an accessory device coupled with the hearing device and/or a distributed microphone array associated with a wireless transmitter.

The hearing device comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals, such as input signal, such as microphone input signal(s), such as pre-processed input signals, such as wireless input signals. The processor provides an electrical output signal based on the input signals to the receiver.

The hearing device may comprise a pre-processing unit configured to obtain a processing context parameter from the accessory device and/or processed input signals from the accessory device. The processor is configured to select a first hearing processing scheme based on the processing context parameter; and apply a selected first hearing processing scheme to input signals of the hearing device. The processed input signals may be provided to the receiver configured to output the signals into ear canal of the user.

FIG. 1 shows a hearing system comprising an exemplary hearing device according to the disclosure and an accessory device according to the disclosure.

Throughout, the same reference numerals are used for identical or corresponding parts.

FIG. 1 shows an exemplary hearing system 300 comprising an exemplary hearing device 2 and an exemplary accessory device 200 as disclosed herein.

The accessory device 200 comprises a memory 204, an interface 206, a processor 208, and a display 202 wherein the accessory device 200 is configured to connect to the hearing device 2. The accessory device 200 is configured to perform any of the methods disclosed herein. The processor 208 is configured to determine an environment parameter, and determine a processing context parameter based on the environment parameter The display 202 may be configured to display on the display a first user interface object representative of the processing context parameter.

The interface 206 may comprise a communication interface, such as a wireless communication interface. The interface 206 may be configured to obtain an environment parameter, e.g. from a server.

The accessory device 200 may comprise a set of microphones. The set of microphones may comprise one or more microphones.

In one or more exemplary accessory devices, the environment parameter comprises a location parameter and/or an environment type parameter. The location parameter may be indicative of a location of the hearing device. The environment type parameter may be indicative of a type of environment or a type of location. The environment type or location type may be indicative of one or more of: an indoor location type, an outdoor location type, a train station type, an airport type, a concert hall type, a school type, a classroom type, a vehicular type (e.g. indicative of whether the hearing device is located in a vehicle, such as a train, car, bicycle in motion).

The processor 208 may be configured to determine an environment parameter by receiving, via the interface 206, a wireless input signal, and determining the environment parameter based on the wireless input signal. For example, receiving a wireless input signal from a wireless local area network may be indicative of a location parameter (e.g. of the location being home, office, school, restaurant), or of an environment type parameter (e.g. of indoor location type, airport type, a concert hall type, a school type, a classroom type). For example, receiving a wireless localization input signal from a wireless navigation network (e.g. GPS) may be indicative of a location parameter (e.g. of the location being home, office, school, restaurant, e.g. of the location information (e.g. geographic coordinates)), or of an environment type parameter (e.g. of indoor location type, airport type, a concert hall type, a school type, a classroom type, a vehicular type). For example, receiving a wireless input signal from a short-range wireless system (e.g. Bluetooth) may be indicative of a location parameter (e.g. of the location being home, office, school), or of an environment type parameter (e.g. of indoor location type, a vehicular type (e.g. when the vehicle transmits short-range wireless input signals)).

In one or more exemplary accessory devices, the interface 206 is configured to receive a wireless input signal (e.g. a wireless input signal from a wireless local area network indicative of a location parameter (e.g. of the location being home, office, school, restaurant), or of an environment type parameter (e.g. of indoor location type, airport type, a concert hall type, a school type, a classroom type); a wireless localization input signal from a wireless navigation network (e.g. GPS) indicative of a location parameter (e.g. of the location being home, office, school, restaurant, e.g. of the location information (e.g. geographic coordinates)), or of an environment type parameter (e.g. of indoor location type, airport type, a concert hall type, a school type, a classroom type, a vehicular type); a wireless input signal from a short-range wireless system (e.g. Bluetooth) indicative of a location parameter (e.g. of the location being home, office, school), or of an environment type parameter (e.g. of indoor location type, a vehicular type (e.g. when the vehicle transmits short-range wireless input signals))), to support the processor 208 in determining the environment parameter based on the wireless input signal, and to e.g. provide (e.g. to transmit) the determined environment parameter to the hearing device 2.

The processor 208 may be configured to determine the processing context parameter based on the environment parameter by determining whether the environment parameter satisfies one or more first criteria. In one or more exemplary methods, determining a processing context parameter based on the environment parameter comprises in accordance with the environment parameter satisfying the one or more first criteria, determining the processing context parameter corresponding to the environment parameter. In one or more exemplary methods, the one or more first criteria comprise a location criterion, and determining whether the environment parameter satisfies the one or more first criteria comprises determining whether the environment parameter satisfies the location criterion. In one or more exemplary methods, determining whether the environment parameter satisfies the location criterion comprises determining whether the environment parameter is indicative of a location that is comprised in a geographic area present in a hearing processing database. The hearing processing database may refer to a database comprising one or more of: a set of hearing processing scheme identifiers, one or more sets of sound signals (e.g. output signals for provision by a receiver of the hearing device), corresponding timestamps. The hearing processing database can be envisaged to include a hearing processing library, such as a hearing processing collection, such as a hearing processing map. The hearing processing database may be stored on one or more of: a memory unit of the hearing device memory, an accessory device coupled to hearing device, or a remote storage mean from which the processing context parameter is retrievable upon request from the hearing device and/or the accessory device.

The processor 208 may be configured to determine a scene tag based on the environment parameter, by e.g. by determining the scene tag based on the processing context parameter (e.g. a parameter indicative of a hearing processing context to be used by a hearing device coupled with the accessory device, such as indicative of the hearing processing scheme to be applied at the hearing device).

The processor 208 may be configured to associate one or more processing context parameters and one or more environment parameters with a scene tag.

The processor 208 may be configured to determine a more favourable scene tag based on the environment parameter and/or on at least a part of the plurality of input signals The interface 206 may be configured to obtain a plurality of input signals 201 from the hearing device 2. The plurality of input signals 201 from the hearing device 2 may comprise a plurality of wireless input signals from the hearing device 2, e.g. based on one or more microphones input signals 9, 11, captured by the hearing device 2 configured to communicate with the accessory device 200.

The processor 208 may be configured to select a hearing processing scheme based on the processing context parameter and applying the hearing processing scheme to at least a part of or the plurality of input signals 201 and transmitting via the interface 206 the processed input signals (e.g. in signal 5) to the hearing device 2

The interface 206 may be configured to transmit the processing context parameter to the hearing device 2 (e.g. the processing context parameter comprising a noise cancellation scheme identifier and/or a prioritization scheme identifier, and/or one or more output signal indicators indicative of one or more output signals to be transmitted to the hearing device). The interface 206 may be configured to transmit processed input signals to the hearing device 2.

The hearing device 2 comprises an antenna 4 for converting a first wireless input signal 5 from the accessory device 200 to an antenna output signal. The first wireless input signal 5 may comprise the processing context parameter and/or processed input signals from the accessory device 200.

The hearing device 2 comprises a radio transceiver 6 coupled to the antenna 4 for converting the antenna output signal to one or more transceiver input signals 7, and a set of microphones comprising a first microphone 8 and optionally a second microphone 10 for provision of respective first microphone input signal 9 and second microphone input signal 11.

The hearing device 2 optionally comprises a pre-processing unit 12 connected to the radio transceiver 6, the first microphone 8 and the second microphone 10 for receiving and pre-processing the transceiver input signal(s) 7, the first microphone input signal 9 and the second microphone input signal 11. The pre-processing unit 12 is configured to pre-process the input signals 7, 9, 11 and provide pre-processed input signals as output to the processor 14.

The hearing device 2 may comprise a memory unit 18.

The hearing device 2 comprises a processor 14 connected to the pre-processing unit 12 for receiving and processing pre-processed input signals comprising one or more pre-processed transceiver input signals 7A, pre-processed first microphone input signal 9A and pre-processed second microphone input signal 11A.

The pre-processing unit 12 may be configured to select a first hearing processing scheme based on the processing context parameter received from the accessory device 200 (wherein the processing context parameter comprises a noise cancellation scheme identifier and/or a prioritization scheme identifier, and/or one or more output signal indicators indicative of one or more output signals to be transmitted to the hearing device); and provide the selected hearing processing scheme to the processor 14. The processor 14 may be configured to apply the selected first hearing processing scheme to any one or more of the input signals 7A, 9A, 11A and provide an electrical output signal 15 to the receiver 16.

A receiver 16 converts the electrical output signal 15 to an audio output signal to be directed towards an eardrum of the hearing device user.

The processed input signals may be provided by the processor 14 to the receiver 16 configured to output the signals into ear canal of the user.

The processor 14 may be configured to compensate for a hearing loss of a user and to provide an electrical output signal 15 based on input signals 7A, 9A, 11A processed according to the present disclosure.

Figure 2A:
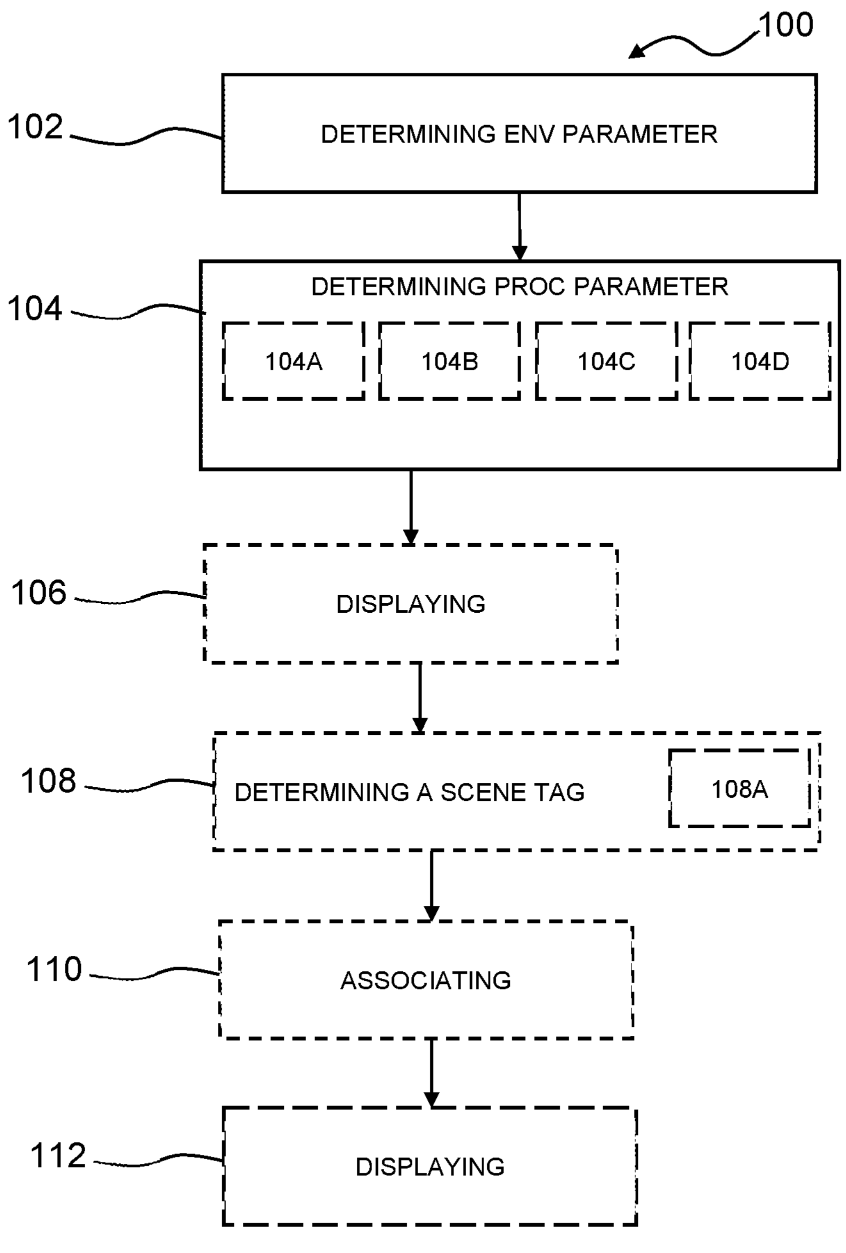
FIGS. 2A-2B is a flow diagram of an exemplary method according to the disclosure, FIG. 3 schematically illustrates an exemplary user interface displayed on a display of an exemplary accessory device according to the disclosure.
Figure 2B:
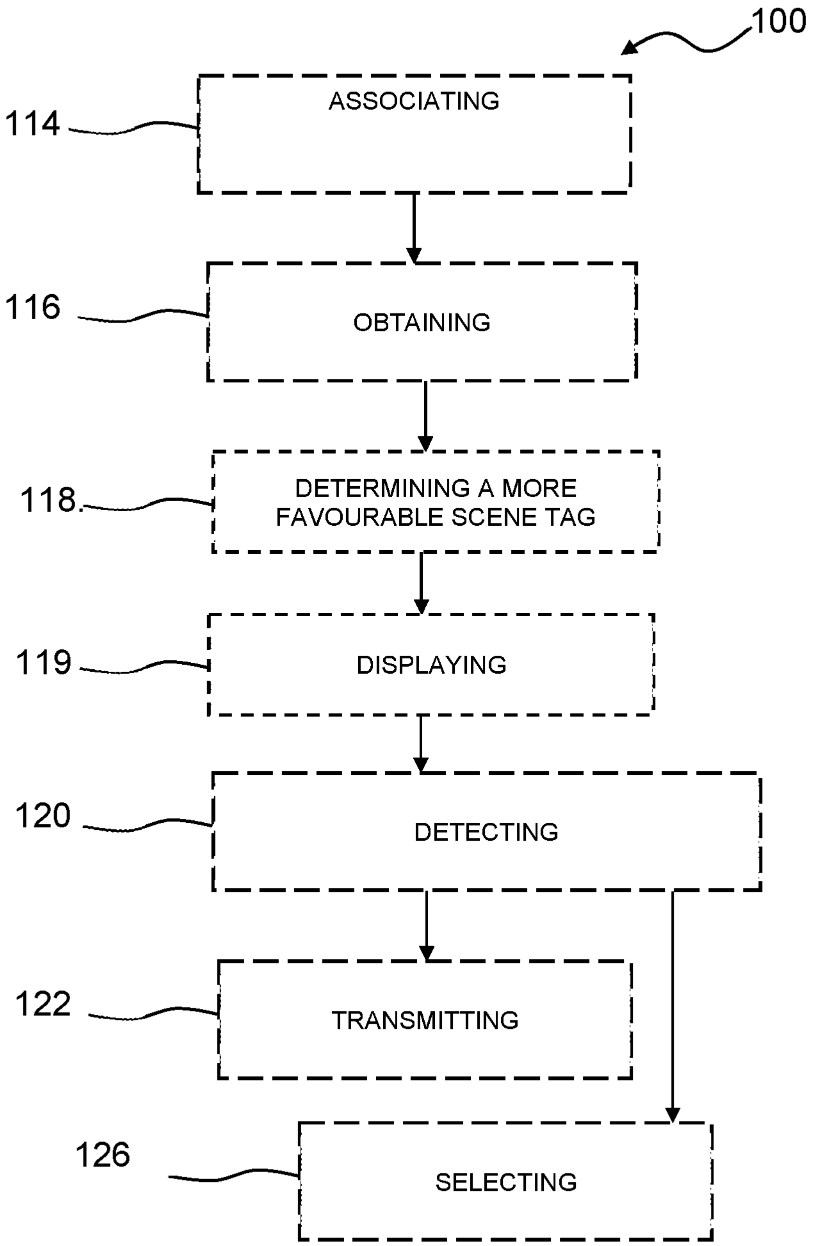

FIGS. 2A-2B are flow diagrams of an exemplary method 100, performed in an accessory device, for controlling a hearing device. The accessory device comprises an interface, a memory, a display, and a processor.

The method 100 comprises determining 102 an environment parameter. For example, the method 100 may comprise determining 102, using the processor, an environment parameter.

The method 100 comprises determining 104 a processing context parameter based on the environment parameter. For example, the method 100 may comprise determining 104, using the processor, a processing context parameter based on the environment parameter.

The method 100 may comprise displaying 106 on the display a first user interface object representative of the processing context parameter. The environment parameter may be indicative of location.

The method 100 may comprise storing, on the memory, the determined processing context parameter, such as storing temporarily or permanently.

In one or more exemplary methods, displaying a user interface object, e.g. a first user interface object (e.g. in step 106) and/or a second user interface object (e.g. in step 112) and/or a third user interface object (e.g. in step 119) comprises displaying a text prompt, an icon and/or an image. The first user interface object may be representative of a hearing processing scheme identifier.

In one or more exemplary methods, the method 100 comprises detecting 120 a user input selecting the first user interface object representative of the processing context parameter. In one or more exemplary methods, the method 100 comprises 122: in response to detecting the user input, transmitting via the interface to the hearing device the processing context parameter or optionally 126: in response to detecting the user input, selecting the hearing processing scheme based on the processing context parameter and applying the hearing processing scheme to the plurality of input signals and transmitting via the interface the processed input signals to the hearing device.

A processing context parameter refers herein to a parameter which indicative of a context of an environment where the hearing device is operating, and which indicates a processing scheme to be (preferably) used in the environment so as to e.g. reduce noise, to compress, to prioritize input signals to improve the processing of the hearing device, e.g. for compensation of hearing loss.

In one or more exemplary methods, the environment parameter comprises a location parameter and/or an environment type parameter. Determining 102 the environment parameter may comprise receiving a wireless input signal, and determining the environment parameter based on the wireless input signal (e.g. from a wireless local area network (e.g. of a home, office, school, and/or restaurant), from a wireless navigation network (e.g. GPS), from a short-range wireless system (e.g. Bluetooth)).

In one or more exemplary methods, determining 104 the processing context parameter based on the environment parameter comprises determining 104A whether the environment parameter satisfies one or more first criteria. In one or more exemplary methods, determining 104 the processing context parameter based on the environment parameter comprises 104B: in accordance with the environment parameter satisfying the one or more first criteria, determining the processing context parameter corresponding to the environment parameter.

In one or more exemplary methods, the one or more first criteria comprise a location criterion, and determining 104A whether the environment parameter satisfies the one or more first criteria comprises determining whether the environment parameter satisfies the location criterion. In one or more exemplary methods, determining whether the environment parameter satisfies the location criterion comprises determining whether the environment parameter is indicative of a location that is comprised in a geographic area present in a hearing processing database. Determining whether the environment parameter is indicative of a location that is comprised in a geographic area present in a hearing processing database may comprise transmitting a request comprising the environment parameter to a remotely located hearing processing database and receiving a response comprising an indication on whether the environment parameter is indicative of a location that is comprised in a geographic area present in the hearing processing database, and optionally a processing context parameter when the environment parameter is indicative of a location that is comprised in a geographic area present in the hearing processing database.

The one or more first criteria may comprise a time criterion. The time criterion may comprise a time period. Determining 104A whether the environment parameter satisfies the one or more first criteria may comprise determining whether the environment parameter satisfies the time criterion by determining whether the environment parameter is indicative of a location that has been created and/or updated within the time period of the time criterion. In accordance with the determination that the environment parameter is indicative of a location that has been created and/or updated beyond the time period of the time criterion, it is determined that the environment parameter does not satisfies the time criterion, and thereby does not satisfy the one or more first criteria.

The method 100 may comprise obtaining one or more input signals, e.g. via one or more microphones of the accessory device and/or via the interface of the accessory device (e.g. via a wireless interface of the accessory device) from the hearing device or an external device. An input signal may comprise microphone input signal and/or a wireless input signal (e.g. a wireless streaming signal). Obtaining one or more input signals may comprise obtaining one or more input signals from the acoustic environment (e.g. via the one or more microphones) or from a hearing device configured to communicate with the accessory device via the interface.

In one or more exemplary methods, the method 100 comprises, in accordance with the environment parameter not satisfying the first criterion, recording at least a part of the one or more input signals. In one or more exemplary methods, the method comprises, in accordance with the environment parameter not satisfying the first criterion, storing, in the memory, at least a part of the one or more input signals and/or one or more parameters characterizing at least a part of the one or more input signals.

In one or more exemplary methods, the processing context parameter comprises a noise cancellation scheme identifier and/or a prioritization scheme identifier, and/or one or more output signal indicators indicative of one or more output signals to be transmitted to the hearing device. In one or more exemplary methods, the one or more output signals comprise an alert signal, an alarm signal and/or one or more streamed signals. The processing context parameter may reflect user preferences in terms of the desirability of sound sources with respect to the environment parameter. The processing context parameter may comprise a noise cancellation scheme identifier, and/or a prioritization scheme identifier, and/or one or more output signal indicators indicative of one or more output signals to be output by the hearing device. A noise cancellation scheme identifier may refer to an identifier uniquely identifying a noise cancellation scheme. A prioritization scheme identifier may refer to an identifier uniquely identifying a prioritization scheme. The one or more output indicators are indicative of one or more output signals (e.g. an alert sound, an alarm sound, a streamed signal) to be output by the hearing device, such as by the receiver.

In one or more exemplary methods, the method 100 comprises determining 108 a scene tag based on the environment parameter. A scene tag may be indicative of an acoustic environment, e.g.: at work, at home, at school, indoor and/or outdoor. In one or more exemplary methods, the method 100 comprises associating 110 the environment parameter with the scene tag. In one or more exemplary methods, the method 100 comprises displaying 112 on the display a second user interface object representative of the scene tag.

In one or more exemplary methods, the method 100 comprises detecting 120 a user input selecting the second user interface object representative of the scene tag. In one or more exemplary methods, the method 100 comprises 122: in response to detecting the user input, retrieving, from the memory or a remote hearing processing database, the processing context parameter corresponding to the scene tag and transmitting via the interface to the hearing device the processing context parameter or optionally 126: in response to detecting the user input, selecting the hearing processing scheme based on the processing context parameter, and applying the hearing processing scheme to the plurality of input signals and transmitting via the interface the processed input signals to the hearing device.

In one or more exemplary methods, determining 108 a scene tag representative of the environment parameter comprises determining 108A the scene tag based on the processing context parameter (e.g. a parameter indicative of a hearing processing context to be used by a hearing device coupled with the accessory device, such as indicative of the hearing processing scheme to be applied at the hearing device).

In one or more exemplary methods, the method 100 comprises associating 114 one or more processing context parameters and one or more environment parameters with a scene tag.

In one or more exemplary methods, the method 100 comprises obtaining 116 a plurality of input signals from the hearing device. The plurality of input signals from the hearing device may comprise a plurality of wireless input signals from the hearing device, e.g. based on one or more microphones input signals captured by the hearing device configured to communicate with the accessory device.

In one or more exemplary methods, determining 104 a processing context parameter based on the environment parameter comprises determining 104C a hearing processing scheme based on the environment parameter and on at least a part of the plurality of input signals. Determining 104C the hearing processing scheme based on the environment parameter and on at least a part of the plurality of input signals may be performed based on the processing context parameter. In one or more exemplary methods, determining 104 a processing context parameter based on the environment parameter comprises transmitting 104D the processing context parameter to the hearing device.

In one or more exemplary methods, the method 100 comprises selecting the hearing processing scheme based on the processing context parameter and applying the hearing processing scheme to at least a part of or the plurality of input signals and transmitting via the interface the processed input signals to the hearing device.

In one or more exemplary methods, the method comprises 118: determining a more favourable scene tag based on the environment parameter and/or on at least a part of the plurality of input signals. The method 100 may comprise displaying 119 on the display a third user interface object representative of the more favourable scene tag. For example, a more favourable scene tag based on the environment parameter refers to a scene tag that is determined by the accessory device as appropriate for improving or performing, at the hearing device, hearing processing based on the environment parameter and/or on at least a part of the plurality of input signals. The accessory device may be configured to access a collective hearing processing database configured to store the environment parameter with a corresponding processing context parameter for optimal processing at the hearing device. The accessory device may be configured to store, in the memory, the determined environment parameter with a corresponding determined processing context parameter and a more favourable scene tag for optimal processing at the hearing device.

In one or more exemplary methods, the method 100 comprises detecting 120 a user input selecting the third user interface object representative of the more favourable scene tag. In one or more exemplary methods, the method 100 comprises 122: in response to detecting the user input, transmitting via the interface to the hearing device an updated processing context parameter corresponding to the more favourable scene tag. For example, the accessory device may perform scene tag selection based on default user preferences and the method comprises determining a more favourable scene tag, displaying on the display a third user interface object representative of the more favourable scene tag, detecting a user input selecting the third user interface object representative of the more favourable scene tag, and in response to detecting the user input, transmitting via the interface to the hearing device an updated processing context parameter corresponding to the more favourable scene tag.

In one or more exemplary methods, the method 100 comprises detecting 120 a user input selecting the third user interface object representative of the more favourable scene tag. In one or more exemplary methods, the method comprises 126: in response to detecting the user input, selecting the hearing processing scheme based on an updated processing context parameter corresponding to the more favourable scene tag, and applying the hearing processing scheme to the plurality of input signals and transmitting via the interface the processed input signals to the hearing device. This allows to feed the hearing device directly with processed input signals, thereby results in an improved battery life at the hearing device.

Figure 3:
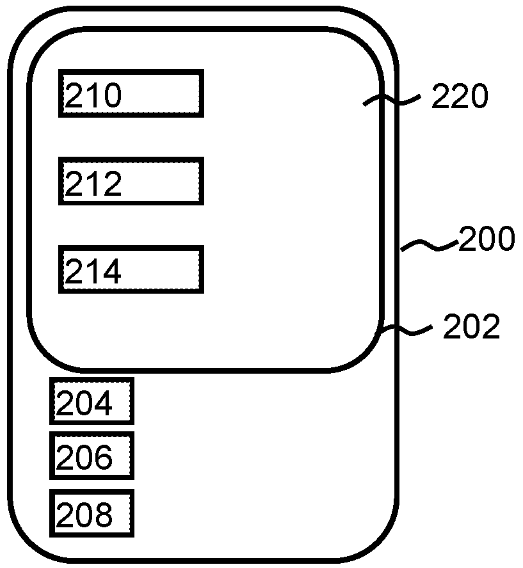

FIG. 3 shows an exemplary user interface 220 displayed on a display 202 of an accessory device 200 according to the present disclosure.

The user interface 220 comprises a first user interface object 210 representative of the processing context parameter. The first user interface object 210 may comprise a text prompt (e.g. "enable noise cancellation scheme 1") and/or an icon (e.g. a slide, a ticking box) and/or an image. A user input selecting the first user interface object 210 enables a transmission of the processing scheme to the hearing device and/or an application of the processing scheme indicated by the first user interface object.

The user interface 220 comprises a second user interface object 212 representative of the scene tag. The second user interface object 212 may comprise a text prompt (e.g. "school") and/or an icon (e.g. a slide, a ticking box) and/or an image. A user input selecting the first user interface object 210 enables a transmission of the processing scheme corresponding to the scene to the hearing device and/or an application of the processing scheme corresponding to the scene.

The user interface 220 comprises a third user interface object 214 representative of a more favourable scene tag. The third user interface object 214 may comprise a text prompt (e.g. "outdoor") and/or an icon (e.g. a slide, a ticking box) and/or an image.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2 hearing device
4 antenna
5 first wireless input signal
6 radio transceiver
7 transceiver input signal
7A pre-processed transceiver input signal
8 first microphone
9 first microphone input signal
9A pre-processed first microphone input signal
10 second microphone
11 second microphone input signal
11A pre-processed second microphone input signal
12 pre-processing unit
14 processor
15 electrical output signal
16 receiver
100 method for controlling a hearing device
102 determining an environment parameter
104 determining the processing context parameter based on the environment parameter
104A determining whether the environment parameter satisfies one or more first criteria
104B in accordance with the environment parameter satisfying the one or more first criteria, determining the processing context parameter corresponding to the environment parameter
104C determining a hearing processing scheme based on the environment parameter and on at least a part of the plurality of input signals.
104D transmitting the processing context parameter to the hearing device.
106 displaying on the display a first user interface object representative of the processing context parameter
108 determining a scene tag based on the environment parameter
108A determining the scene tag based on the processing context parameter
110 associating the environment parameter with the scene tag
112 displaying on the display a second user interface object representative of the scene tag
114 associating one or more processing context parameters and one or more environment parameters with a scene tag
116 obtaining a plurality of input signals from the hearing device
118 determining a more favourable scene tag based on the environment parameter and/or on at least a part of the plurality of input signals
119 displaying on the display a third user interface object representative of the more favourable scene tag
120 detecting a user input selecting the first user interface object representative of the processing context parameter
122 in response to detecting the user input, transmitting via the interface to the hearing device an updated processing context parameter corresponding to the more favourable scene tag
126 in response to detecting the user input, selecting the hearing processing scheme based on an updated processing context parameter corresponding to the more favourable scene tag, and applying the hearing processing scheme to the plurality of input signals and transmitting via the interface the processed input signals to the hearing device
200 accessory device
201 input signals from the hearing device
202 display
204 memory
206 interface
208 processor
210 first user interface object representative of the processing context parameter
212 second user interface object representative of the scene tag
214 third user interface object representative of a more favourable scene tag
220 user interface

The invention claimed is:

1. A method performed by an accessory device for controlling a hearing device, the accessory device comprising an interface, a memory, a display, and a processor, the method comprising:

determining an environment parameter, wherein the environment parameter is based on position data wirelessly provided by a network, and wherein the environment parameter is indicative of an environment type or a location type;

determining a processing context parameter after the environment parameter is determined;

obtaining a plurality of input signals, wherein the input signals are wirelessly transmitted from the hearing device to the accessory device;

determining a scene tag based on the environment parameter and/or based on at least a part of the plurality of input signals; and displaying on the display a user interface object representative of the scene tag;

wherein the environment parameter and the scene tag comprise non-audio data and are different from each other.

2. The method according to claim 1, wherein the act of determining the processing context parameter comprises:

determining whether the environment parameter satisfies one or more first criteria, and in accordance with the environment parameter satisfying the one or more first criteria, determining the processing context parameter corresponding to the environment parameter.

3. The method according to claim 1, wherein the user interface object representative of the scene tag is user-selectable.

4. The method according to claim 1, wherein the processing context parameter comprises a noise cancellation scheme identifier, and/or a prioritization scheme identifier, and/or one or more output signal indicators indicative of one or more output signals to be transmitted to the hearing device.

5. The method according to claim 1, further comprising associating the environment parameter with the scene tag.

6. The method according to claim 1, wherein the scene tag is determined based indirectly on the environment parameter.

7. The method according to claim 6, wherein the processing context parameter is determined based on the environment parameter, and wherein the scene tag is determined based on the processing context parameter.

8. The method according to claim 1, further comprising:

detecting a user input selecting the user interface object representative of a scene tag; and after the user input is detected, retrieving the processing context parameter corresponding to the scene tag, and transmitting the processing context parameter via the interface of the accessory device to the hearing device.

9. The method according to claim 1, further comprising displaying on the display of the accessory device another user interface object representative of the processing context parameter.

10. The method according to claim 9, further comprising:

detecting a user input selecting the other user interface object representative of the processing context parameter; and after the user input is detected, transmitting the processing context parameter via the interface of the accessory device to the hearing device.

11. The method according to claim 1, wherein the act of determining the processing context parameter comprises determining a hearing processing scheme based on the environment parameter and at least a part of the plurality of input signals.

12. The method according to claim 1, further comprising transmitting the processing context parameter to the hearing device.

13. The method according to claim 1, further comprising:

detecting a user input selecting the user interface object representative of the scene tag, and after the user input is detected, transmitting via the interface to the hearing device an updated processing context parameter corresponding to the scene tag.

14. The method according to claim 1, further comprising:

detecting a user input selecting the user interface object representative of the scene tag, and after the user input is detected, selecting a hearing processing scheme based on an updated processing context parameter corresponding to the scene tag.

15. The method according to claim 14, further comprising applying the hearing processing scheme to the plurality of input signals from the hearing device.

16. The method according to claim 15, wherein the hearing processing scheme is applied to the plurality of input signals to obtain processed input signals, and wherein the method further comprises transmitting the processed input signals via the interface of the accessory device to the hearing device.

17. The method according to claim 1, wherein the environment parameter comprises a location-type parameter and/or an environment-type parameter.

18. The method according to claim 1, wherein the input signals are wirelessly transmitted from the hearing device to the accessory device while the hearing device is worn by a user.

19. An accessory device comprising a memory, an interface, a processor, and a display wherein the accessory device is configured to communicate with a hearing device, wherein the accessory device is configured to:

determine an environment parameter, wherein the environment parameter is based on position data wirelessly provided by a network, and wherein the environment parameter is indicative of an environment type or a location type;

determine a processing context parameter after the environment parameter is determined;

obtain a plurality of input signals that are wirelessly transmitted from the hearing device to the accessory device;

determine a scene tag based on the environment parameter and/or on at least a part of the plurality of input signals; and display on the display a user interface object representative of the scene tag;

wherein the environment parameter and the scene tag comprise non-audio data and are different from each other.

20. The accessory device according to claim 19, wherein the accessory device is configured to process the plurality of input signals to obtain processed signals, and wirelessly transmit the processed signals for reception by the hearing device.

21. The accessory device according to claim 19, wherein the accessory device is configured to obtain the plurality of input signals that are transmitted from the hearing device while the hearing device worn by a user.

22. A hearing system comprising an accessory device according to claim 19, and the hearing device.

* * * * *